US012616229B2

(12) United States Patent
Colmignoli et al.

(10) Patent No.: US 12,616,229 B2
(45) Date of Patent: May 5, 2026

(54) PRESERVATIVE FREE SALAMI

(71) Applicant: Olli Salumeria Americana LLC, Oceanside, CA (US)

(72) Inventors: Oliviero Colmignoli, Encinitas, CA (US); Garrett Walsh, San Diego, CA (US); Enrico Porrino, Solana Beach, CA (US)

(73) Assignee: Olli Salumeria Americana LLC, Oceanside, CA (US)

( * ) Notice: Subject to any disclaimer, the term of this patent is extended or adjusted under 35 U.S.C. 154(b) by 0 days.

(21) Appl. No.: 19/078,100

(22) Filed: Mar. 12, 2025

(65) Prior Publication Data

US 2025/0287979 A1     Sep. 18, 2025

Related U.S. Application Data

(60) Provisional application No. 63/564,431, filed on Mar. 12, 2024.

(51) Int. Cl.
| | |
|---|---|
| *A23L 13/60* | (2016.01) |
| *A23B 4/03* | (2006.01) |
| *A23B 4/22* | (2006.01) |
| *A23L 13/40* | (2023.01) |

(52) U.S. Cl.
CPC .............. *A23L 13/60* (2016.08); *A23B 4/03* (2013.01); *A23B 4/22* (2013.01); *A23L 13/428* (2016.08); *A23L 13/46* (2016.08)

(58) Field of Classification Search
CPC ........ A23L 13/60; A23L 13/428; A23L 13/46; A23B 4/03; A23B 4/22
See application file for complete search history.

(56) References Cited

FOREIGN PATENT DOCUMENTS

| | | | | |
|---|---|---|---|---|
| AU | 2017100951 A4 | 8/2017 | | |
| BE | 1021260 B1 | * 10/2015 | ............. | A23L 13/65 |
| KR | 10-1859609 B1 | 5/2018 | | |
| KR | 10-2548113 B1 | 6/2023 | | |

OTHER PUBLICATIONS

BE 1021260 B1 English translation (Year: 2015).*
English translation (Year: 2015).*
Rocchetti et al., Impact of hurdle technologies and low temperatures during ripening on the production of nitrate-free pork salami: A microbiological and metabolomic comparison,LWT—Food Science and Technology, vol. 141, Apr. 2021 [Retrieved on Apr. 17, 2025]. Retrieved from the internet: <URL: https://www.sciencedirect.com/science/article/abs/pii/S002364382100092X>.
International Search Report and Written Opinion mailed May 5, 2025 in international application No. PCT/US2025/019596, 10 pages.

* cited by examiner

*Primary Examiner* — Vera Stulii
(74) *Attorney, Agent, or Firm* — Procopio, Cory, Hargreaves & Savitch LLP; Pattric J. Rawlins

(57)     ABSTRACT

A method for preparing salami includes preparing a meat batter by mixing at least one meat and at least one additional ingredient, wherein the at least one additional ingredient excludes nitrates and excludes nitrites. The method also includes forming a plurality of salamis by placing a portion of the meat batter into each of a plurality of casings. The method also includes fermenting the plurality of salamis to a predetermined pH level and drying the plurality of salamis to a predetermined water activity.

12 Claims, 13 Drawing Sheets

100

110
PREPARE STARTER CULTURE SOLUTION

115
GRIND MEAT THROUGH 12.7MM PLATE

120
MIX MEAT, DRY INGREDIENTS, WINE, STARTER CULTURE SOLUTION AND SALT INTO MEAT BATTER

125
GRIND MEAT BATTER THROUGH 5MM PLATE

130
STUFF MEAT BATTER INTO CASINGS TO FORM SALAMIS

135
PLACE SALAMIS ON FERMENTATION RACKS

200

300

| AMOUNT | INGREDIENTS |
|---|---|
| 2.4 LBS | HIGH GRADE SEA SALT |
| 1 LBS | NAT T-10 CUR S |
| 1 LBS | TURBINADO SUGAR |
| 0.3 LBS | ROSEMARY EXTRACT |
| 0.12 LBS | NUTMEG POWDER |
| 0.06 LBS | WHITE PEPPER GROUND |
| 0.05 LBS | GARLIC |
| 0.2 LBS | WINE |
| 10.1 GRAMS | STARTER CULTURE |
| 100 LBS | MEAT |

| Description: Initial | Sample ID: 0512202101_Acid | | | | | | | Diameter: 108mm | | | |
| --- | --- | --- | --- | --- | --- | --- | --- | --- | --- | --- | --- |
| | Yield % | pH instrument (direct probe) | pH from Titratable Acidity (TA) | Titratable Acidity (TA) | Water Activity (aw) | Fat - Soxhlet AOAC 960.39 | Moisture - Forced Air Oven AOAC 950.46Bb | Protein - Kjeldahl AOAC 991.20.1 | M:p Ratio | Salt (calculated from chloride) AOAC 983.14 | Nitrate Enzymatic, R- Biopharm | Nitrate USDA NT11 |
| Control average total | 100 | | | | | | | | | | | |
| As sampled for analysis | | 5.7 | 5.67 5.7 5.69 5.69 | 0.69 0.67 0.69 0.68 | 0.000 | | | | | | 32ppm | 40ppm |
| Inoculated | | | | | | | | | | | | |
| Average as sampled for analysis | | | | | | | | | | | | |
| Inoculated average total house | | 0 | | | | | | | | | | |
| Total days from beginning of fermentation | | | | | | | | | | | | |

FIG. 5

Description: Post Ferment | Sample ID: 0514202101_Acid | Diameter: 105mm

| | Yield % | pH measurement (direct probe) | pH from Titratable Acidity (TA) | Titratable Acidity (TA) | Water Activity (aw) | Fat-Soxhlet AOAC 960.39 | Moisture –Forced Air Oven AOAC 950.46B | Protein – Kjeldahl AOAC 991.20.1 | M:p Ratio | Salt (calculated from chloride) AOAC 983.14 |
|---|---|---|---|---|---|---|---|---|---|---|
| Control average total | 100 | | | | | | | | | |
| As sampled for analysis | | 4.77 | 4.34 4.31 4.34 4.34 | 1.45 1.51 1.51 1.49 | 0.000 | | | | | |
| Inoculated Average as sampled for analysis | 0.00 | | | | | | | | | |
| Inoculated average total basis | | | | | | | | | | |
| Total days from beginning of fermentation | | 2 | | | | | | | | |

FIG. 6

| Description: Mid Dry | Yield % | pH instrument (direct probe) | pH from Titratable Acidity (TA) | Titratable Acidity (TA) | Water Activity (aw) | Fat - Soxhlet AOAC 960.39 | Moisture – Forced Air Oven AOAC 950.46Bb | Protein – Kjeldahl AOAC 991.20.1 | M:p Ratio | Salt (calculated from chloride) AOAC 983.14 |
|---|---|---|---|---|---|---|---|---|---|---|
| Control average total | 74.55 | | | | | | | | | |
| As sampled for analysis | 74.59 | 4.69 | 4.77 4.99 5.04 4.93 | 1.44 1.49 1.43 1.45 | 0.952 0.958 0.954 0.955 | | | | | |
| Inoculated | 72.56 73.13 72.84 | | | | | | | | | |
| Average as sampled for analysis | 72.84 | | | | | | | | | |
| Inoculated average total loss | 73.88 | | | | | | | | | |
| Total days from beginning of fermentation | | 20 | | | | | | | | |

Sample ID: 060120210L-Acid    Diameter: 100um

FIG. 7

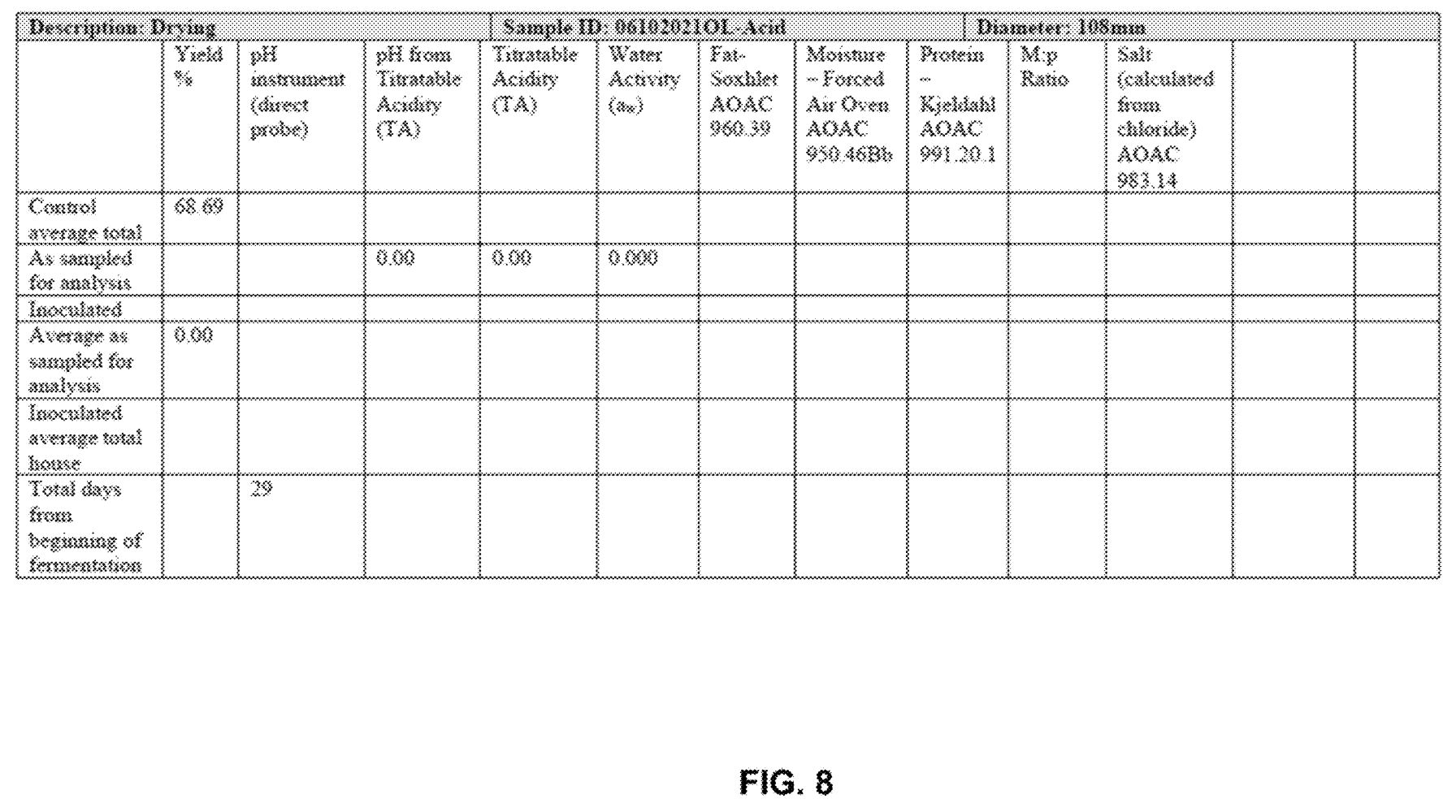

| Description: Drying | | | Sample ID: 0610202101-Acid | | | | | Diameter: 100mm | |
|---|---|---|---|---|---|---|---|---|---|
| Yield % | pH measurement (direct probe) | pH from Titratable Acidity (TA) | Titratable Acidity (TA) | Water Activity (aw) | Fat - Soxhlet AOAC 960.39 | Moisture - Forced Air Oven AOAC 950.46Bb | Protein - Kjeldahl AOAC 991.20.1 | Mp Ratio | Salt (calculated from chloride) AOAC 983.14 |
| Control average total | 68.09 | | | | | | | | |
| As sampled for analysis | | | 0.00 | 0.00 | 0.000 | | | | |
| Inoculated | | | | | | | | | |
| Average as sampled for analysis | 0.00 | | | | | | | | |
| Inoculated average total batter | | 29 | | | | | | | |
| Total days from beginning of fermentation | | | | | | | | | |

FIG. 8

| Description: Final Dry aw < 0.92 | | Sample ID: 063S2021OL-Acid 41140207 | | | | | | | Diameter: 105mm |
|---|---|---|---|---|---|---|---|---|---|
| | Yield % | pH instrument (direct probe) | pH from Titratable Acidity (TA) | Titratable Acidity (TA) | Water Activity (aw) | Fat - Soxhlet AOAC 960.39 | Moisture - Forced Air Oven AOAC 950.46Bb | Protein - Kjeldahl AOAC 991.20.1 | M:p Ratio | Salt (calculated from chloride) AOAC 983.14 |
| Control average total | 61.31 | | | | | | | | | |
| As sampled for analysis | 60.31 | 4.97 | 5.11 5.14 5.13 5.13 | 1.69 1.67 1.67 1.68 | 0.911 0.918 0.918 0.916 | 22.96 | 43.87 | 27.24 | 1.61:1 | 4.61 |
| Inoculated | 60.36 60.80 59.71 60.02 | | | | | | | | | |
| Average as sampled for analysis | | | | | | | | | | |
| Inoculated average total house | 60.68 | | | Hygrometer | | | | | | |
| Total days from beginning of fermentation | | 47 | | | | | | | | |

FIG. 9

| Description: Drying | | Sample ID: 07022021OL Acid | | | | | Diameter 108mm | | | | |
|---|---|---|---|---|---|---|---|---|---|---|---|
| | Yield % | pH instrument (direct probe) | pH from Titratable Acidity (TA) | Titratable Acidity (TA) | Water Activity (aw) | Fat- Soxhlet AOAC 960.39 | Moisture – Forced Air Oven AOAC 950.46Bb | Protein – Kjeldahl AOAC 991.20.1 | M.p Ratio | Salt (calculated from chloride) AOAC 983.14 | |
| Control average total | 60.28 | | | | | | | | | | |
| As sampled for analysis | 59.47 | | 0.00 | 0.00 | 0.906 0.912 0.906 0.908 | | | | | 54.14 | |
| Inoculated | | | | | | | | | | | |
| Average as sampled for analysis | 0.00 | | | | 0.000 | | | Note-Hygrometer 57/52=70% rh | | | |
| Inoculated average total | 59.64 | | | | | | | | | | |
| Total days from beginning of fermentation | | 51 | | | | | | | | | |

FIG. 10

| Description: Extended Dry a_w 0.900 | | Sample ID: 07122021 OL Acid 41148391 | | Diameter: 108mm | | | | | | | |
|---|---|---|---|---|---|---|---|---|---|---|---|
| | Yield % | pH instrument (direct probe) | pH from Titratable Acidity (TA) | Titratable Acidity (TA) | Water Activity (a_w) | Fat-Soxhlet AOAC 960.39 | Moisture – Forced Air Oven AOAC 950.46Bb | Protein – Kjeldahl AOAC 991.20.1 | M:p Ratio | Salt (calculated from chloride) AOAC 983.14 | |
| Control average total | 57.53 | | | | | | | | | | |
| As sampled for analysis | 56.99 | 5.07 | 5.2 | 1.77 | 0.893 | 25.4 | 38.75 | 29.1 | 29.1 | 1.33:1 | 4.7 |
| | | | 5.44 | 1.63 | 0.9 | | | | | | |
| | | | 5.49 | 1.67 | 0.896 | | | | | | |
| | | | 5.36 | 1.69 | 0.896 | | | | | | |
| Inoculated | 56.88 | | | | | | | | | | |
| | 56.48 | | | | | | | | | | |
| | 54.9 | | | | | | | | | | |
| Average as sampled for analysis | 56.09 | | | | | | | Note: Hygrometer 60/54=73% rh | | | |
| Inoculated average total loss | 56.9 | | | | | | | | | | |
| Total days from beginning of fermentation | | 61 | | | | | | | | | |

| Description: Extended Dry III aw - 0.85 | | Sample ID: 0823202301 Acid 41262021 | | | | | | Diameter: 100mm | | | | |
|---|---|---|---|---|---|---|---|---|---|---|---|---|
| | Yield % | pH measurement (direct probe) | pH from Titratable Acidity (TA) | Titratable Acidity (TA) | Water Activity (aw) | Fat - Soxhlet AOAC 960.39 | Moisture - Forced Air Oven AOAC 950.46Bb | Protein - Kjeldahl AOAC 991.20.1 | Mp Ratio | Salt (calculated from chloride) AOAC 983.14 | Nitrate Enzymatic, R-Biopharm | Nitrate USDA NTI1 |
| Control average total | 51.06 | | | | | | | | | | | |
| As sampled for analysis | 50.54 | 5.32 | 5.72 5.80 5.98 5.63 | 1.68 1.70 1.76 1.71 | 0.841 0.849 0.844 0.845 | 29.14 | 31.07 | 33.69 | 0.92:1 | 5.29 | 28 ppm | inconclusive |
| Inoculated | 50.75 50.54 50.61 | | | | | | | | | | | |
| Average as sampled for analysis | | | | | | | | | | | | |
| Inoculated average total house | 50.61 | | | | | | | | | | | |
| Total days from beginning of fermentation | | 103 | | | | | | | | | | |

FIG. 13

PRESERVATIVE FREE SALAMI

RELATED APPLICATION

The present application claims priority to U.S. provisional patent application No. 63/564,431 filed 12 Mar. 2024, which is incorporated herein by reference in its entirety.

BACKGROUND

Field of the Invention

The disclosure is generally directed toward the preparation of cured meats and more particularly directed toward a preservative free salami and a method of preparation of preservative free salami.

Related Art

Conventional salami is made by adding nitrates and/or nitrites as a direct chemical additive or through sources such as vegetable juice powders, leafy greens, cultured celery, and sea salt. There are significant problems and risks associated with adding nitrates and/or nitrites when making salami. While the addition of nitrates and/or nitrites shortens the curing process required to achieve the necessary reduction in the number of microorganisms to be safe for consumption, it is a compromise that favors manufacturing speed over the health of consumers. Studies have proven that nitrates can pose serious health concerns, particularly when added to foods in volume and from synthetic sources. Nitrates cannot be digested. Instead they are converted by gut biome into nitrites, an inorganic, water-soluble chemical. Additionally, nitrates that are added during the curing process can react with organic compounds in the food during the fermentation part of the curing process, producing nitrosamines which are considered to be carcinogenic.

In recent years, consumer demand for clean label products has grown dramatically. As science furthers our understanding of the health benefits and risks of additives in our foods, consumers desire minimally processed products with ingredient transparency. This desire has increased consumer demand for foods that contain simple, natural ingredients that are easy to understand. Within the salami category, this means that consumers are demanding products with high quality ingredients and without any additives that expedite the curing process. Accordingly, what is needed is a way to maintain manufacturing speed without the use of nitrates and/or nitrites used in the conventional preparation of salami.

SUMMARY

To address the problems described above, disclosed herein are preservative free salamis and methods to manufacture preservative free salamis.

In some aspects, the techniques described herein relate to a method for preparing salami including: preparing a meat batter by mixing at least one meat and at least one additional ingredient, wherein the at least one additional ingredient excludes nitrates and excludes nitrites; forming a plurality of salamis by placing a portion of the meat batter into each of a plurality of casings; fermenting the plurality of salamis to a predetermined pH level; and drying the plurality of salamis to a predetermined water activity.

In some aspects, the techniques described herein relate to a method, further including grinding the meat before preparing the meat batter.

In some aspects, the techniques described herein relate to a method, further including grinding the meat batter before forming the plurality of salamis.

In some aspects, the techniques described herein relate to a method, wherein the at least one additional ingredient includes dry ingredients, wine, a starter culture solution, and hi-grade salt.

In some aspects, the techniques described herein relate to a method, wherein the dry ingredients include one or more of Nat-T10 Cur S, turbinado sugar, rosemary extract, wine, garlic, starter culture, nutmeg powder, white pepper ground, mace, black pepper cracked, paprika sweet 85 asta, chili crushed, red pepper ground, fennel seed whole, oregano, anise seed, oleoresin of paprika, aroma stagionato, aroma felino, smoke powder, bourbon powder, bourbon liquid, pequin flakes, new mexico red, ancho powder, black pepper whole, cinnamon powder, clove powder, fennel pollen, pimenton de la vera, and cumin.

In some aspects, the techniques described herein relate to a method, wherein the predetermined pH level is less than 5.30.

In some aspects, the techniques described herein relate to a method, wherein the predetermined water activity is less than or equal to 0.85.

In some aspects, the techniques described herein relate to a method, wherein fermenting includes fermenting for a predetermined time period of at least 40 hours.

In some aspects, the techniques described herein relate to a salami including at least one meat and at least one additional ingredient, wherein the at least one additional ingredient excludes nitrates and excludes nitrites.

In some aspects, the techniques described herein relate to a salami, wherein the at least one additional ingredient includes dry ingredients, wine, a starter culture solution, and hi-grade salt.

In some aspects, the techniques described herein relate to a salami, wherein the dry ingredients include one or more of Nat-T10 Cur S, turbinado sugar, rosemary extract, wine, garlic, starter culture, nutmeg powder, white pepper ground, mace, black pepper cracked, paprika sweet 85 asta, chili crushed, red pepper ground, fennel seed whole, oregano, anise seed, oleoresin of paprika, aroma stagionato, aroma felino, smoke powder, bourbon powder, bourbon liquid, pequin flakes, new mexico red, ancho powder, black pepper whole, cinnamon powder, clove powder, fennel pollen, pimenton de la vera, and cumin.

BRIEF DESCRIPTION OF THE DRAWINGS

The structure and operation of the present invention will be understood from a review of the following detailed description and the accompanying drawings in which like reference numerals refer to like parts and in which:

Figure 12:
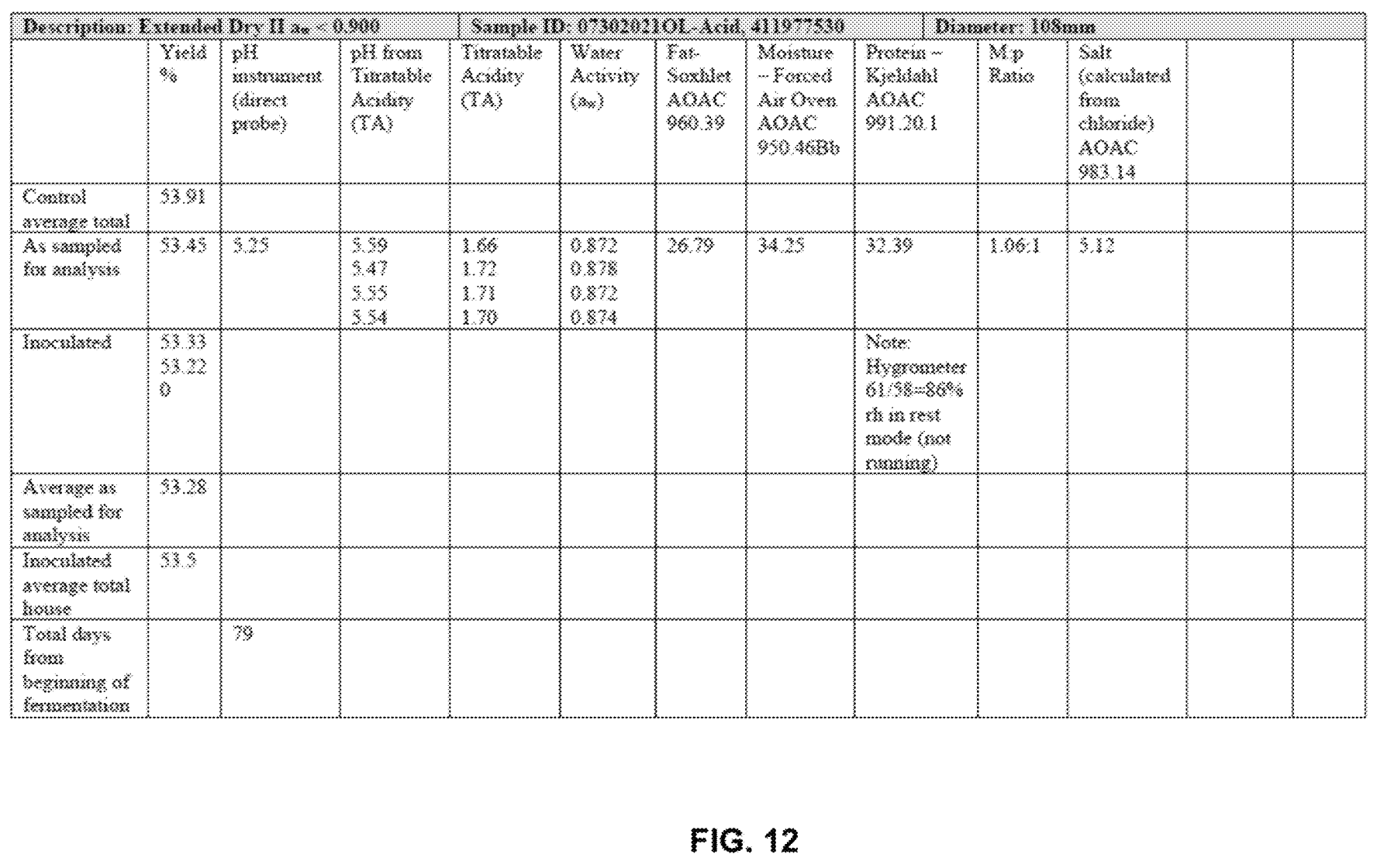

FIGS. 5-13 are comparative diagrams illustrating characteristics of example salami products during various stages of preparation.

DETAILED DESCRIPTION

Disclosed herein is a novel method for preparing salami excluding nitrates and nitrites. For example, one method disclosed herein includes.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Typical nitrate and nitrite additives expedite the curing process, which is designed to create a product that is microbially safe for consumption. These nitrogen-based compounds stabilize the heme iron of the hemoglobin protein in meat, providing a shortcut to curing and serving as a preservative that inactivates microbes and thereby reduces the number of microorganisms to a level that is safe for consumption. In some cases, nitrates and/or nitrites are added directly (e.g., as a chemical additive) or added indirectly through sources such as vegetable juice powders, leafy greens, cultured celery, and sea salt (which may include small amounts of nitrates and/or nitrites). However, there are risks associated with adding nitrates and/or nitrites when making salami and studies have proven that nitrates can pose serious health concerns, particularly when added to foods in volume and/or from synthetic sources. Additionally, nitrates that are added during the curing process can react with organic compounds in the food during the fermentation part of the curing process, producing nitrosamines which are considered to be carcinogenic.

The present disclosure describes a novel method for making salami that excludes nitrates and nitrates. The nitrates and nitrites are excluded in the direct form (e.g., a chemical additive) and also excluded in the indirect form (e.g., vegetable juice powders, leafy greens, cultured celery, and high-grade salt, which does not include nitrates and/or nitrites). Advantageously, the method and ingredients of the present disclosure still reduces the number of microorganisms to a level that is safe for consumption and does not compromise manufacturing speed.

Figure 1:
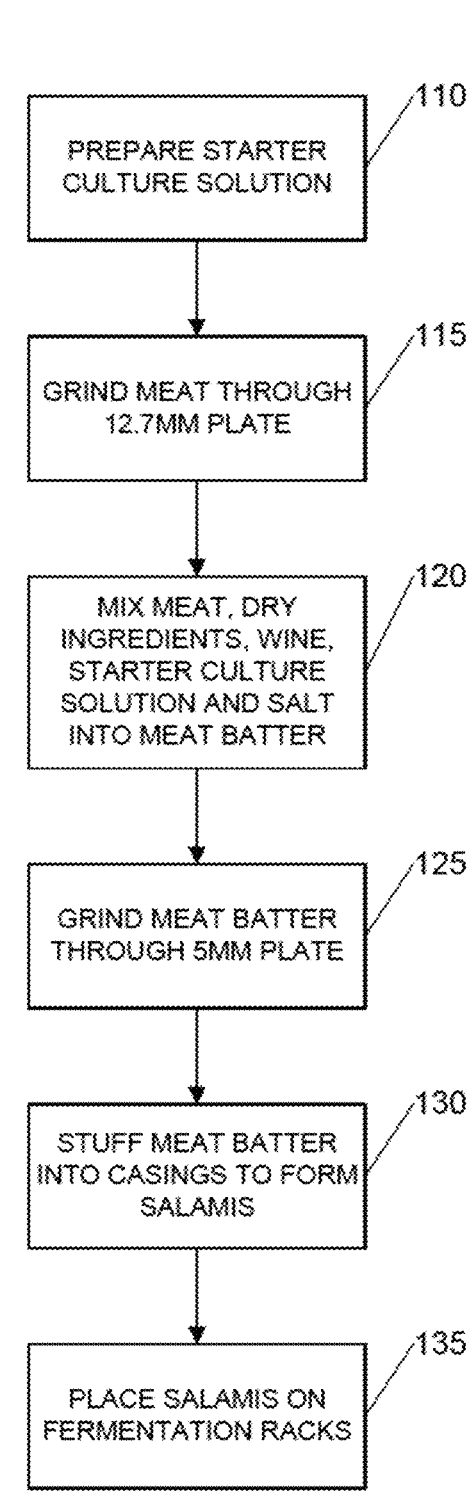
FIG. 1 is a flow diagram illustrating an example process for preparing salami according to an embodiment of the invention.

FIG. 1 is a flow diagram illustrating an example process 100 for preparing salami according to an embodiment of the invention. Initially, at 110, a starter culture solution is prepared. In one aspect, the starter culture solution includes *Debaryomyces hansenii, lactobacillus* sakei, *Pediococcus acidilactici, Pediococcus pentosaceus, Staphylococcus carnosus,* and *Staphylococcus xylosus.*

Next, at 115, the meat (e.g., pork) is ground through a plate with 12.7 mm through-holes. As will be understood by the skilled artisan, the size of the through-holes for the initial grind of the meat can be larger or smaller than the 12.7 mm plate. In one aspect, the temperature of the meat is at or around 29.9° F. to start the initial grinding process.

Next, at 120, a meat batter is prepared by mixing at least one meat and at least one additional ingredient. Importantly, the at least one additional ingredient excludes nitrates and excludes nitrites. The exclusion of nitrates and/or nitrites is an exclusion of both chemical additive nitrates and/or nitrites and other sources that includes nitrates and/or nitrites such as vegetable juice powders, leafy greens, cultured celery, and sea salt. Preferably, when the meat batter is prepared, the ground meat is at or around 29.9° F. to start the mixing process.

In one aspect the additional ingredients may include dry ingredients, wine, the previously prepared starter solution, and salt. For example, the dry ingredients may include one or more of Nat-T10 Cur s, hi-grade salt, turbinado sugar, rosemary extract, wine, garlic, starter culture, nutmeg powder, white pepper ground, mace, black pepper cracked, paprika sweet 85 asta, chili crushed, red pepper ground, fennel seed whole, oregano, anise seed, oleoresin of paprika, aroma stagionato, aroma felino, smoke powder, bourbon powder, bourbon liquid, pequin flakes, new mexico red, ancho powder, black pepper whole, cinnamon powder, clove powder, fennel pollen, pimenton de la vera, and cumin. Additional ingredients may include fat (e.g., backfat), dry ground nutmeg, sunflower lecithin, and refined sunflower oil. The meat and the additional ingredients may be mixed using a ribbon mixer to prepare the meat batter.

Next, at 125, the meat batter is ground through a plate with 5 mm through-holes. As will be understood by the skilled artisan, the size of the through-holes for the secondary grind of the meat batter can be larger or smaller than the 5 mm plate. Importantly, the size of the through-holes for the secondary grind of the meat batter is smaller than the size of the through-holes for the initial grind of the meat. For example, the grind size may be anywhere from 1 mm to 8 mm, preferably in the 3 mm-7 mm range.

Next, at 130, the meat batter is stuffed into casings to form a plurality of raw salamis. In one aspect, the casings range between 105 mm-110 mm in length, preferably between 107 mm-108 mm. In one aspect, the temperature of the meat batter is maintained between 27° F. and 28° F. during the stuffing process.

Next, at 135, the salamis are placed on a fermentation rack in preparation for fermentation and drying.

Figure 2:
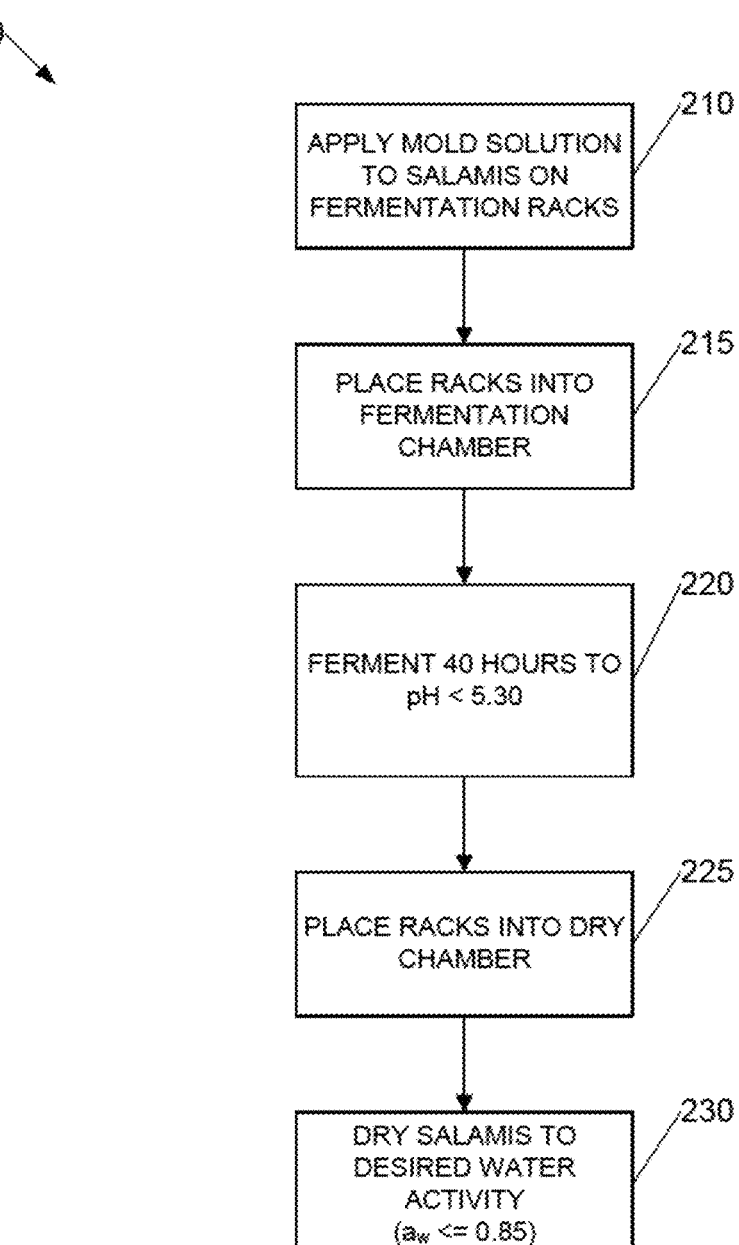
FIG. 2 is a flow diagram illustrating an example process for preparing salami according to an embodiment of the invention.

FIG. 2 is a flow diagram illustrating an example process 200 for preparing salami according to an embodiment of the invention. Initially, at 210 a mold solution is applied to the salamis on the fermentation rack. In one aspect, the mold solution includes sucrose and culture.

Next, at 215, the racks with the salamis having the mold solution applied to them are placed into a fermentation chamber.

Next, at 220, the salamis are fermented in the fermentation chamber for a predetermined amount of time or until they reach a predetermined pH level. In one aspect, the salamis are fermented until they have a pH level of less than 5.30. For example, fermenting the salamis to a pH level of less than 5.30 pH may take in the range of 35-45 hours. Alternatively, the salamis are fermented in the fermentation chamber for at least 40 hours. In one aspect, the salamis are fermented at a substantially constant temperature less than 90° F., for example the salamis may be fermented at a substantially constant temperature of 82° F.

Next at 225, the fermentation racks with the salamis having less than 5.30 pH are placed into a drying chamber.

Next, at 230, the salamis are dried in the drying chamber for a predetermined amount of time or until they reach a predetermine water activity level. In one aspect, the salamis are dried until they have an $A_w$ level of less than or equal to 0.85. For example, drying the salamis to an $A_w$ level of less than or equal to 0.85 may take in the range of 3 to 4 months.

Figure 3:
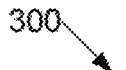
FIG. 3 is a block diagram illustrating an example recipe for preparing salami according to an embodiment of the invention.

FIG. 3 is a block diagram illustrating an example recipe 300 for preparing salami according to an embodiment of the invention. In the illustrated embodiment, the salami ingredients include 100 pounds of meat, 2.4 pounds of hi-grade sea salt, 1 pound of NAT T-10 CUR S, 1 pound of turbinado sugar, 0.3 pounds of rosemary extract, 0.12 pounds of nutmeg powder, 0.06 pounds of ground white pepper, 0.05 pounds of garlic, 0.2 pounds of wine, and 10.1 grams of starter culture solution.

When the salami is prepared for fermentation and drying as described above, the meat is initially course ground and then mixed with the hi-grade sea salt, NAT T-10 CUR S, turbinado sugar, rosemary extract, nutmeg power, ground white pepper, garlic, wine, and starter culture solution to form the meat batter. The meat batter is placed into individual casings and then the fermentation and drying process takes place as described above.

Example 1

In this example, survival of *Salmonella, E. coli* O157:H7, *Listeria monocytogenes, C. perfringens*, and Coagulase Positive *S. aureus* was evaluated in a non-heated salami manufactured using certain ingredients and a certain processing protocol. This example is described in connection with the below written description and Tables 1-3 and FIGS. 4-13.

Materials & Method

The present example followed the protocol designed by the Microbiology Division of the USDA, FSIS combined with the protocol employed by Goodfellow and Brown, Fate of *Salmonella* Inoculated into Beef for Cooking, J. Food Prot., Vol. 41, No. 8, August 1978, Pages 598-605, which serves as the basis for cooking regulations for both the USDA (Appendix A) and FDA (Food Code).

The salami batches representing the complete raw formulation were prepared and the uninoculated controls were stuffed and sampled for analysis of the five pathogens. The test batches were then inoculated with a mixed cocktail of all strains of all five pathogens (*Salmonella, E. coli* O157:H7, *Listeria monocytogenes, C. perfringens*, and Coagulase Positive *S. aureus*). The target inoculation levels were $10^7$ CFU per gram for all five pathogens. The pathogen inoculated batches were then stuffed into the same casing sizes as the control batches employing an F. Dick stuffer. Both control and inoculated stuffed salami products were placed into a fermentation/dry chamber for fermentation and drying in accordance with the fermentation program.

Direct plating methodology was employed in this example to evaluate log reduction during fermentation and drying. When numbers of the pathogen decreased to less than 10 CFU/g by direct plating, the presence/absence of the pathogen was determined by enrichment employing standard methods used in the USDA Microbiological Guidebook, FDA B.A. Manual or the Health Canada's Compendium of Analytical Methods.

Micro Pathogen Sampling Periods

The micro pathogen sampling periods were as follows: (A) Initial, immediately after stuffing—(3×) triplicate samples, (2×) duplicate plating, (1×) formula, (1×) casing diameter (3×2×1×1=6 samples); (B) After fermentation— (3×) triplicate samples, (2×) duplicate plating, (1×) formula, (1×) casing diameter (3×2×1×1=6 samples); (C) Mid-Dry—

(3×) triplicate samples, (2×) duplicate plating, (1×) formula, (1×) casing diameter (3×2×1×1=6 samples); (D) Final-Dry to achieved $a_w$<0.92—(3×) triplicate samples, (2×) duplicate plating, (1×) formula, (1×) casing diameter (3×2×1×1=6 samples); (E) Extended-Dry to achieved $a_w$<0.900 (3×) triplicate samples, (2×) duplicate plating, (1×) formula, (1×) casing diameter (3×2×1×1=6 samples); (F) Extended-Dry II to achieved $a_w$<0.88 (3×) triplicate samples, (2×) duplicate plating, (1×) formula, (1×) casing diameter (3×2×1×1=6 samples); (G) Extended-Dry III to achieved $a_w$<0.85 (3×) triplicate samples, (2×) duplicate plating, (1×) formula, (1×) casing diameter (3×2×1×1=6 samples).

The total number of pathogen samples was forty-two for one product.

Micro Controls Per Product

The micro controls per product were as follows: (A) Negative Controls at Beginning of Study—Duplicate samples (2 Samples); (B) Negative Controls at End of Study—Duplicate samples (2 Samples).

The total negative control samples were four per product. With only one product, there were four negative control samples in total.

Micro Study Culture Controls

The micro study culture controls were as follows: (A) Culture Controls=Duplicate samples (two samples).

The total culture control samples were two per study.

Accordingly, the total micro testing for the two products were: forty two (42) pathogen samples+four (4) negative control samples+two (2) duplicate samples for a total of forty eight (48).

Chemistry Samples

Measurement of process parameters used to determine when a product was finished at each stage of production (control program criteria): duplicate uninoculated samples of the product which were collected after stuffing and collected at each production stage were assayed for moisture, fat, protein, salt content, pH, aw, and titratable acidity (TA). Accordingly, the total number of samples for additional analysis:

Time zero (1)=pH and TA.

After fermentation (1)=pH and TA.

Mid Dry (1)=pH and aw.

Final Dry aw<0.920 (1)=moisture, fat, protein, salt content, pH, aw, and titratable acidity (TA).

Extended Dry aw<0.900 (1)=moisture, fat, protein, salt content, pH, aw, and titratable acidity (TA).

Extended Dry II aw<0.880 (1)=moisture, fat, protein, salt content, pH, aw, and titratable acidity (TA).

Extended Dry III aw<0.850 (1)=moisture, fat, protein, salt content, pH, aw, and titratable acidity (TA).

Total=seven (7) measurements

One (1) total number of replicates multiplied by seven (7) total number of chemistry samples results in seven (7) total measurements.

Sampling Process for pH

Both the Consort C864 pH data logging unit and the Vinmetrica model S-300 were calibrated using fresh pH 7 and pH 4 buffer solutions prior to all sample readings conducted.

Sampling Process for Water Activity (aw)

Samples were collected at various percent yields and water activities (aw) were monitored during the drying process. Triplicate sliced core samples were collected from one stick of salami and analyzed on an Aqua Lab Series 4TE analyzer. When triplicate samples within one stick of salami were all below target water activity then those values were averaged and reported. Core samples were not chopped or diced before they were analyzed in the Aqua Lab instrument (worst case).

Salami Manufacture Protocol:

The salami manufacturing protocol was as follows: (A) (A) meat and other materials were confirmed to be in good condition; (B) pork was ground through ½-inch (12.7 mm) plate at 29.9° F.; (C) prior to production, a 10% starter cultured/Di-water solution was prepared. The solution was prepared to utilize one full starter culture pouch; (D) prior to production, all ingredients were prepared for each batch; (E) meat (at 29.9° F.), dry ingredients, wine, starter culture solution and salt were mixed in ribbon mixer per Table 1 below to form the meat batter; (F) the meat batter was ground through ³⁄₁₆-inch (5 mm) plate; (G) the meat batters were then inoculated and the inoculated meat batters were stuffed into 107-108 mm Hukki casings; (H) the control meat batters were then stuffed into 107-108 mm Hukki casings as a stuffing temperature of 27-28° F.; (I) the salamis were placed onto fermentation racks; (J) a mold solution was prepared and applied to salamis per Table 2 below; (K) the salamis were then placed into fermentation chamber and fermented on cycle F1 for a full forty hours per Table 3 below to obtain a pH<5.30. It was noted that a pH<5.20 was achieved during the first forty hours of fermentation and the project continued; (L) the salamis were then dried in dry chamber to aw 0.960-0.940 per Table 3 below to Mid-Dry; (M) the salamis continued to dry to average target $a_w \leq 0.920$ to Final Dry for 47 days; (N) the salamis continued to dry to average target $a_w \leq 0.900$ to Extended Dry for 61 days; (O) the salamis continued to dry to average target $a_w \leq 0.88$ to Extended Dry II for 79 days; and (P) the salamis continued to dry to average target aw≤0.85 to Extended Dry III for 103 days.

TABLE 1

| MPS5020 Mother-Genoa-P/S-G Formulation per 100 lbs. meat | | |
|---|---|---|
| Ingredient | Acid (lbs.) | Acid Percent (%) |
| Pork Shoulder Boneless (Danish Crown) | 100.0000 | 95.8017 |
| Cargill Salt-3903 Hi-Grade | 2.4000 | 2.2992 |
| Prosur NATPRE T-10 CUR S | 1.0000 | 0.9580 |
| Turbinado Sugar | 0.7000 | 0.6706 |
| White Pepper | 0.0400 | 0.0383 |
| Lake Glenn Farms Peeled Garlic | 0.0200 | 0.0192 |
| Wine Terra Viva Marche Sangiovese | 0.2000 | 0.1916 |
| SafePro B-LC-007 (50 g/225 Kg) Lot# 3570036 | 0.0223 (10.1 gr) | 0.0214 |
| Total | 104.3823 | 100.00 |

TABLE 2

| Mold Solution | | |
|---|---|---|
| Ingredient | Amount | Percent |
| Water | 49,950 grams | 99.90 |
| Chr.Hansen 800 Mold Culture 50 g/50 L Lot# 3557379 | 50.00 grams | 0.1 |
| Total | 50,000.00 (50 Liters) | 100.000 |

TABLE 3

| Fermentation/Drying/Aging Process | | | | |
|---|---|---|---|---|
| Dry Bulb ° F. | Wet Bulb | % rH | Time | |
| 70-82 (21-28° C.) | 0 | 90-100 | 40:00 | (F1) Ferment |
| 59-79 (15-26° C.) | 0 | 65-90 | 24:00 | (D2) Drying |
| 54-70 (12-21° C.) | 0 | 65-85 | 48:00 | (D3) Drying |
| 54-63 (12-17° C.) | 0 | 65-85 | Until aw 0.920, 0.900, 0.880 | (D4) Drying |

*Time adjusted based on hydration and dehydration. Total time 3-4 months

Fermentation Standards

The standards used in the present example were to reduce the pH of product to an acceptable level in an acceptable time period to prevent possible outgrowth and toxin production from *S. aureus*. Specifically, meat pH should decline to 5.3 within an acceptable time temperature combination (temperature in degrees F. (° F.), (time in hours). To calculate degree hours, the following equation can be used:

$$[\text{Fermentation Temperature (° F.)}-60] \times \text{time (hours)} = \text{degree hours}$$

and the process is acceptable if the total degree hours are fewer than 1,200 degree hours when the lowest fermentation temperature is less than 90° F. (32° C.).

Acid

Fermentation was constant at 82° F. for 20 hours. Calculating degree hours results in 82–60-22 degree multiplied by 20 hours for a total of 440 fermentation degree-hours with a pH decline to <5.30.

Figure 4:
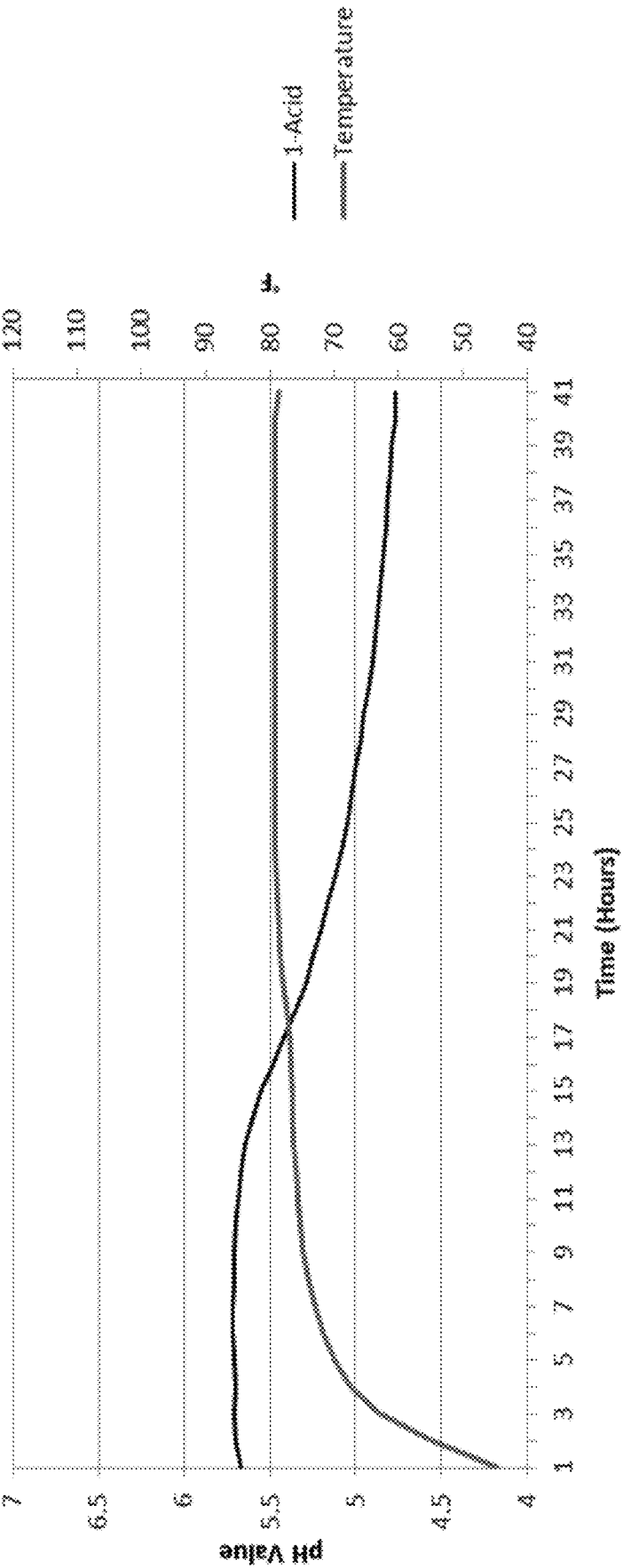
FIG. 4 is a graph diagram illustrating an example comparison of acid and temperature in a salami product over time according to an embodiment of the invention.

Fermentation was continued at 82° F. for twenty three (23) hours (506 degree-hours) to a pH of 5.16. Fermentation was then continued at 82° F. for forty (40) hours (880 degree-hours) to a final pH of 4.77. A graph of this progression is illustrated in FIG. 4.

Example 2

In this example, the fate of inoculated strains of *Salmonella* spp., *Escherichia coli* O157:H7, *Listeria monocytogenes, Clostridium perfringens*, and *Staphylococcus aureus* in a fermented and dried salami product was evaluated. This example is described in connection with the below written description and portions of the description from Example 1, and Tables 4-10.

Materials & Method

The present example followed the protocol designed by the Microbiology Division of the USDA, FSIS combined with the protocol employed by Goodfellow and Brown, Fate of *Salmonella* Inoculated into Beef for Cooking, J. Food Prot., Vol. 41, No. 8, August 1978. Pages 598-605, which serves as the basis for cooking regulations for both the USDA (Appendix A) and FDA (Food Code).

This example used fresh USDA inspected meat ingredients, spices, starter cultures, casings, and other formulation components. The meat formulation employed in this study represented a typical salami base formula.

The strains of *Salmonella* spp., *E. coli* O157:H7, *L. monocytogenes, S. aureus*, and *C. perfringens* used in this example were the same strains employed in previous studies conducted for more than forty (40) USDA and Canadian inspected establishments and were all obtained from culture collections maintained by the USDA, Deibel Laboratories/ Toxin Technology, and Dr. Steven J. Goodfellow. All strains employed in this study were pathogenic/toxigenic and are established reference strains or strains that had been originally isolated from food poisoning outbreaks. The list of strains is set forth in U.S. provisional patent application No. 63/564,431, which is incorporated herein by reference in its entirety.

Culture Preparation, Enumeration and Inoculation

Individual cultures of each strain for each pathogen (except *C. perfringens*) were inoculated into Trypticase Soy Broth with 1% glucose for about twenty (20) hours prior to conducting the validation study. Cultures were grown at 35° C. Each strain was then centrifuged, washed, and resuspended in 0.1% peptone broth. In order to achieve inoculum culture of sufficient concentration to achieve the target inoculum of about $2.0 \times 10^7$ cfu/g in the inoculated raw batter, each strain was also grown on Trypticase Soy Agar/1% glucose plates for 24 hours, washed off the plates with 0.1% peptone broth and mixed with the broth grown strains. All cultures were harvested within thirty (30) minutes of product inoculation.

*Clostridium perfringens* cultures were grown at 37° C. in Fluid Thioglycollate (FTG) broth anaerobically for twenty four (24) hours, +/−two (2) hours, per growth cycle. A combination of *C. perfringens* vegetative cells and spores was used across several growth cycles.

Direct plating methodology was employed in this example to evaluate log reduction during fermentation, and drying. Direct plating methodology for log reduction evaluation was originally employed by Goodfellow and Brown, 1978 and has subsequently been confirmed by the USDA, ARS, FDA and many academic research studies.

Each of the resuspended strains of *Salmonella* was diluted and plated directly onto Plate Count agar and overlaid with XLD agar. The five resuspended strains were then mixed in equal proportions to prepare the working inoculum and plated onto PCA/XLD agar. The average viable count of the mixed *Salmonella* culture was $1.47 \times 10^9$/ml.

Each of the resuspended strains of *Escherichia coli* 0157: H7 was diluted and plated onto Plate Count Agar with MacConkey Sorbitol Agar (MSA) overlay. The five strains were then mixed as above. The average viable count of the mixed *E. coli* O157:H7 culture was $4.30 \times 10^8$/ml.

Each of the resuspended strains of *Listeria* was diluted and plated directly onto Plate Count Agar and MOX agar to evaluate the effect, if any, of the MOX agar compared with the non-specific medium on viable counts. Viable counts were essentially the same on both agars. Resuspended strains were then mixed in equal proportions to yield approximately equal numbers of the five *Listeria monocytogenes* strains used in this study. The mixed cultures to be used as the inoculum were mixed thoroughly and re-plated onto MOX agar to determine the viable count of the working inoculum. The average viable count of the mixed *Listeria monocytogenes* cultures was $9.00 \times 10^8$/ml.

Each of the resuspended strains of the five *S. aureus* cultures was spread plated onto Baird-Parker agar, combined, and the mixed inoculum re-plated onto the same agar. The average viable count of the mixed inoculum was $1.37 \times 10^9$/ml.

*Clostridium perfringens* cultures were collected from multiple growth cycles of Fluid Thioglycollate (FTG) broth, in order to include both vegetative cells and spores. *C. perfringens* cultures were plated onto Shahidi-Ferguson Perfringens (SFP) Agar, and overlayed with the same (minus egg yolk enrichment). The average viable count of the mixed inoculum was $7.60 \times 10^6$/ml.

Salami Preparation and Fermentation

Triplicate concurrent batches of salami were prepared and represented a complete raw formulation as described in Example 1, including commercial starter cultures.

An uninoculated control batch of salami was also prepared and stuffed. This uninoculated control batch was then sampled for analysis of all five pathogens. Control testing showed undetectable levels of each inoculated pathogen.

Each test batch of the raw batter was then inoculated with separately mixed cocktail batches of all strains of each of the five pathogens. The target inoculation level was $10^{6-7}$ per gram ($10^4$ for *C. perfringens*). The pathogen-inoculated batches were then stuffed into the same casing as the control batches employing an F. Dick stuffer. Each of the three batches of the inoculated product was sampled and plated employing the direct plate methodology detailed above to establish initial inoculation levels of the five pathogens. The average inoculation levels for the pathogens in the raw salami batter were all in the $10^{6-7}$ range, with the exception of *C. perfringens* which started at $10^4$. These results are presented in the below Tables.

Control and inoculated stuffed salami products were placed into an environmentally controlled chamber for fermentation and drying as described in Example 1. Salami products were fermented to a pH value of 5.20 or less and were within the AMI Guidelines.

Fermentation was Conducted to Achieve:

Meat pH should decline to <5.30 within an acceptable time/temperature combination (temperature in degrees F. (° F.), time in hours), which is described in degree hours. The process is acceptable if the total degree hours are fewer than 1,200 degree hours when the lowest fermentation temperature is less than 90° F. (32° C.).

After fermentation achieved the desired pH value, the inoculated product was sampled and analyzed for the five pathogens as described previously.

The inoculated product was sampled in triplicate and plated in duplicate. Post-fermentation results are summarized in Table 4.

TABLE 4

| Pathogen log reductions in the acid salami batches following fermentation | | | | |
| --- | --- | --- | --- | --- |
| Salmonella | E. coli O157:H7 | Listeria monocytogenes | S. aureus | C. perfringens |
| 0.87 log reduction | 0.08 log reduction | 0.98 log reduction | 0.89 log reduction | 0.13 log reduction |

Drying Results

After fermentation, control and inoculated batches were allowed to dry. The product was allowed to dry until the Moisture/Protein ratio had reached <1.9/1 to meet the standard of identity for salami. The water activity benchmark for Final Dry was <0.920. Based on weight loss, the product was sampled midway through the drying cycle (Mid-Dry), and when drying was complete (Final Dry). Three sets of extended dry samples were also taken at $A_w$<0.90, $A_w$<0.88, and $A_w$<0.85.

TABLE 5

| | | Pathogen log reductions in acid salami batches - from raw batter to Mid Dry: | | |
|---|---|---|---|---|
| Salmonella | E. coli O157:H7 | Listeria monocytogenes | S. aureus | C. perfringens |
| 2.73 log reduction | 1.90 log reduction | 1.88 log reduction | 0.88 log reduction | 2.31 log reduction |

TABLE 6

| | | Pathogen log reductions in acid salami batches - from raw batter to Final Dry ($A_w < 0.92$) | | |
|---|---|---|---|---|
| Salmonella | E. coli O157:H7 | Listeria monocytogenes | S. aureus | C. perfringens |
| 3.40 log reduction | 2.82 log reduction | 2.21 log reduction | 0.97 log reduction | 3.57 log reduction |

TABLE 7

| | | Pathogen log reductions in acid salami batches - from raw batter to Extended Dry ($A_w < 0.90$) | | |
|---|---|---|---|---|
| Salmonella | E. coli O157:H7 | Listeria monocytogenes | S. aureus | C. perfringens |
| 4.24 log reduction | 3.38 log reduction | 2.35 log reduction | 1.40 log reduction | 3.76 log reduction |

TABLE 8

| | | Pathogen log reductions in acid salami batches - from raw batter to Extended Dry II ($A_w < 0.88$) | | |
|---|---|---|---|---|
| Salmonella | E. coli O157:H7 | Listeria monocytogenes | S. aureus | C. perfringens |
| 4.68 log reduction | 4.32 log reduction | 2.94 log reduction | 1.63 log reduction | 3.76 log reduction |

TABLE 9

| | | Pathogen log reductions in acid salami batches - from raw batter to Extended Dry III ($A_w < 0.85$) | | |
|---|---|---|---|---|
| Salmonella | E. coli O157:H7 | Listeria monocytogenes | S. aureus | C. perfringens |
| 6.36 log reduction | 5.61 log reduction | 3.47 log reduction | 2.28 log reduction | 3.76 log reduction |

DISCUSSION

According to this Example 2, the process employed to manufacture the fermented and dried salami, namely fermenting to a pH value of 5.3 or less and drying to a Moisture/Protein ratio of about 1.9/1 or less and the water activity values listed above was validated for pathogen log reductions in the salami batches as set forth in Table 10.

| Pathogen | Final Dry ($A_w < 0.920$) | Extended Dry ($A_w < 0.900$) | Extended Dry II ($A_w < 0.88$) | Extended Dry III ($A_w < 0.85$) |
|---|---|---|---|---|
| Salmonella spp. | Avg: 3.40 log reduction 95% CI = 3.23-3.56 | Avg: 4.24 log reduction 95% CI = 3.78-4.70 | Avg: 4.68 log reduction 95% CI = 4.48-4.88 | Avg: 6.36 log reduction 95% CI = 5.54-7.18 |
| E. coli O157:H7 | Avg: 2.82 log reduction 95% CI = 2.70-2.94 | Avg: 3.38 log reduction 95% CI = 3.13-3.63 | Avg: 4.32 log reduction 95% CI = 3.51-5.14 | Avg: 5.61 log reduction 95% CI = 5.61-5.61 |
| L. monocytogenes | Avg: 2.21 log reduction 95% CI = 2.12-2.29 | Avg: 2.35 log reduction 95% CI = 1.73-2.97 | Avg: 2.94 log reduction 95% CI = 2.81-3.06 | Avg: 3.47 log reduction 95% CI = 3.19-3.76 |
| S. aureus | Avg: 0.97 log reduction 95% CI = 0.85-1.09 | Avg: 1.40 log reduction 95% CI = 1.20-1.60 | Avg: 1.63 log reduction 95% CI = 1.51-1.75 | Avg: 2.28 log reduction 95% CI = 1.96-2.61 |
| C. perfringens | Avg: 3.57 log reduction 95% CI = 3.23-3.91 | Avg: 3.76 log reduction 95% CI = 3.76-3.76 | Avg: 3.76 log reduction 95% CI = 3.76-3.76 | Avg: 3.76 log reduction 95% CI = 3.76-3.76 |

Other Example Embodiments

Additional non-limiting examples of preservative free salamis are described below.

Another example embodiment of a preservative free salami are salamini sticks. These are made using the above describe method and ingredients, with a grind size in the range of 3 mm to 6 mm, a casing size diameter in the range of 10 mm to 25 mm, a length in the range of 3 inches to 5 inches, and a fermenting/aging temperature range from 52 F to 90 F.

Another example embodiment of a preservative free salami are chubs. These are made using the above describe method and ingredients, with a grind size in the range of 3.5 mm to 8 mm, a casing size diameter in the range of 40 mm to 60 mm, a length in the range of 5 inches to 7 inches, and a fermenting/aging temperature range from 52 F to 78 F.

Another example embodiment of a preservative free salami are snack packs. These are made using the above describe method and ingredients, with a grind size in the range of 3.5 mm to 6 mm, a casing size diameter in the range of 40 mm to 60 mm, and a fermenting/aging temperature range from 52 F to 78 F.

Another example embodiment of a preservative free salami are pre-sliced salamis. These are made using the above describe method and ingredients, with a grind size in the range of 3.5 mm to 12 mm, a casing size diameter in the range of 60 mm to 105 mm, and a fermenting/aging temperature range from 52 F to 78 F.

Advantageously, the method of manufacturing preservative free salami can be applied to any conventional salami, antibiotic free (ABF) salami, Global Animal Partnership (GAP) step rated sourced pork salami, bulk salami logs, and catchweight packages/bags of sliced or diced salami.

In some aspects, packaging for the preservative free salamis may be vacuum or modified atmosphere packaging with an oxygen percentage in the range of 0-1% of total. (MAP gas mix 20% CO2/80% Nitrogen with about 5% variance either direction or low oxygen accomplished by way of oxygen scavenger ranging in size of 0 cc to 500 cc). Additionally, in some aspects the packaging for the preservative free salamis may comprise semi-rigid and flexible plastics (films and bags) that contain EVOH.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for preparing salami comprising:
preparing a meat batter by mixing at least one meat and at least one additional ingredient, wherein the at least one additional ingredient excludes nitrates and excludes nitrites;
forming a plurality of salamis by placing a portion of the meat batter into each of a plurality of casings;
fermenting the plurality of salamis to a predetermined pH level; and
drying the plurality of salamis to a predetermined water activity.

2. The method of claim 1, further comprising grinding the at least one meat before preparing the meat batter.

3. The method of claim 1, further comprising grinding the meat batter before forming the plurality of salamis.

4. The method of claim 1, wherein the at least one additional ingredient comprises dry ingredients, wine, a starter culture solution, and hi-grade salt.

5. The method of claim 4, wherein the dry ingredients comprise one or more of Nat-T10 Cur S, turbinado sugar, rosemary extract, wine, garlic, starter culture, nutmeg powder, white pepper ground, mace, black pepper cracked, paprika sweet 85 asta, chili crushed, red pepper ground, fennel seed whole, oregano, anise seed, oleoresin of paprika, aroma stagionato, aroma felino, smoke powder, bourbon powder, bourbon liquid, pequin flakes, new mexico red, ancho powder, black pepper whole, cinnamon powder, clove powder, fennel pollen, pimenton de la vera, and cumin.

6. The method of claim 1, wherein the predetermined pH level is less than 5.30.

7. The method of claim 1, wherein the predetermined water activity is less than or equal to 0.85.

8. The method of claim 1, wherein fermenting comprises fermenting for a predetermined time period of at least 40 hours.

9. The method of claim 1, wherein the at least one additional ingredient excludes sea salt.

10. A method for preparing salami comprising:
preparing a meat batter by mixing at least one meat and at least one additional ingredient, wherein the at least one additional ingredient excludes nitrates and excludes nitrites;
forming a plurality of salamis by placing a portion of the meat batter into each of a plurality of casings;
fermenting the plurality of salamis and monitoring pH until a predetermined pH level is reached; and
drying the plurality of salamis and monitoring water activity until a predetermined water activity is reached.

11. A method for preparing salami comprising:
preparing a meat batter by mixing at least one meat and at least one additional ingredient, wherein the at least one additional ingredient excludes nitrates and excludes nitrites;
forming a plurality of salamis by placing a portion of the meat batter into each of a plurality of casings;
fermenting the plurality of salamis at a substantially constant temperature less than 90° F. to a pH level of less than 5.30; and
drying the plurality of salamis to a water activity of less than or equal to 0.85.

12. A method for preparing salami comprising:
preparing a meat batter by mixing at least one meat and at least one additional ingredient, wherein the at least one additional ingredient comprises hi-grade salt, Nat-T10 Cur S, turbinado sugar, rosemary extract, wine, and a starter culture solution comprising debaryomyces *hansenii, Lactobacillus sakei, Pediococcus acidilactici, Pediococcus pentosaceus, Staphylococcus carnosus*, and *Staphylococcus xylosus*, and wherein the at least one additional ingredient excludes nitrates and excludes nitrites;
forming a plurality of salamis by placing a portion of the meat batter into each of a plurality of casings;
fermenting the plurality of salamis at a substantially constant temperature of 82° F. for at least 40 hours to achieve a pH level of less than 5.20; and
drying the plurality of salamis to a water activity of less than or equal to 0.85 to achieve at least a 6 log reduction in *Salmonella* and at least a 5 log reduction in *E. coli* O157:H7.

* * * * *